United States Patent [19]

Eihusen et al.

[11] Patent Number: 5,180,490
[45] Date of Patent: Jan. 19, 1993

[54] LUBRICANT FILTER ASSEMBLY WITH INTERNAL BYPASS LOCK-OUT

[75] Inventors: John A. Eihusen; Roy A. Jared, both of Kearney, Nebr.

[73] Assignee: Baldwin Filters, Inc., Kearney, Nebr.

[21] Appl. No.: 828,555

[22] Filed: Jan. 31, 1992

[51] Int. Cl.⁵ ............................................. B01D 27/08
[52] U.S. Cl. .................... 210/239; 210/240; 210/440; 210/450; 210/DIG. 17
[58] Field of Search .............. 210/168, 232, 239, 240, 210/440, 450, DIG. 13, DIG. 17

[56] References Cited

U.S. PATENT DOCUMENTS 2,473,727  6/1949  Robertson ........................ 210/239
5,078,877  1/1992  Cudaback ........................ 210/315

*Primary Examiner*—Robert A. Dawson
*Assistant Examiner*—Matthew O. Savage
*Attorney, Agent, or Firm*—Leydig, Voit & Mayer

[57] ABSTRACT

An oil filter assembly for an internal combustion engine includes a filter element disposed in a spin-on canister which is detachably secure to a mounting adaptor having a conduit normally permitting some of the filtered lubricating oil to bypass the main lubricating circuit of the engine. The filter element carries a plug which seals the bypass conduit when the canister is installed on the adaptor so as to disable the internal bypass circuit of the adaptor and force all of the filtered oil to flow to the main lubricating circuit.

4 Claims, 2 Drawing Sheets

LUBRICANT FILTER ASSEMBLY WITH INTERNAL BYPASS LOCK-OUT

BACKGROUND OF THE INVENTION

This invention relates to a lubricating oil filter assembly of the type used on internal combustion engines. More specifically, the invention relates to a filter assembly having a spin-on or throwaway type filter cartridge adapted to be secured to a mounting adaptor on an engine having two lubricating oil circuits.

In such an engine, oil from the crankcase is filtered by a primary filter element and a substantial volume of the filtered oil flows to the primary lubricating circuit of the engine. A small percentage of the filtered oil is subjected to further filtration by a secondary filter element and is returned directly to the crankcase. The oil filtered by the secondary filter thus bypasses the main lubricating circuit and is returned to the crankcase in a cleaner condition than the oil flowing through the main circuit.

A filter cartridge for use with such an engine is disclosed in commonly assigned Cudaback U.S. application Ser. No. 411,700, filed Sep. 25, 1989. In such a cartridge, two filter elements are telescoped in coaxial relation with one another within an outer canister. Most of the oil passes through the outer filter to the primary lubricating circuit while some of the oil cleaned by the outer filter passes through the inner filter for further cleaning before flowing to the bypass circuit. A tubular fitting extends through end caps of the filter elements and connects with the mounting adaptor of the engine in order to discharge twice-filtered oil to the bypass circuit while keeping such oil separated from the oil flowing to the primary lubricating circuit. The mounting adaptor includes a stem-like bypass conduit which telescopes with the fitting to establish communication between the inner secondary filter and the bypass circuit.

When the engine is subjected to extremely dirty conditions, the service life of the filter cartridge may be unacceptably short even though the cartridge effects secondary filtration of the bypass oil. Under such circumstances, an external bypass circuit and filter unit may be provided to effect filtration of bypass oil only while a full flow filter cartridge attached to the mounting adaptor effects filtration only of the main lubricating oil. When an external bypass circuit is provided, however, it is necessary to lock out or disable the internal bypass circuit in the mounting adaptor in order to avoid possible starvation of the main lubricating circuit. Prior arrangements for locking out the internal bypass circuit are very expensive and require modification of the mounting adaptor of the engine.

SUMMARY OF THE INVENTION

The general aim of the present invention is to provide an extremely simple and inexpensive device for locking out the internal bypass circuit of a mounting adaptor of the above type and without need of making any modifications at all to the adaptor.

A related object is to provide a simple lock-out device which forms part of the full flow filter cartridge and which disables the internal bypass circuit automatically as an incident to installation of the cartridge on the mounting adaptor.

In a more detailed sense, the invention resides in the provision of a plug carried by the full flow filter and adapted to telescope with and close off the bypass conduit of the mounting adaptor when the filter cartridge is attached to the adaptor.

These and other objects and advantages of the invention will become more apparent from the following detailed description when taken in conjunction with the accompanying drawings.

DETAILED DESCRIPTION OF THE PREFERRED EMBODIMENT

Figure 1:
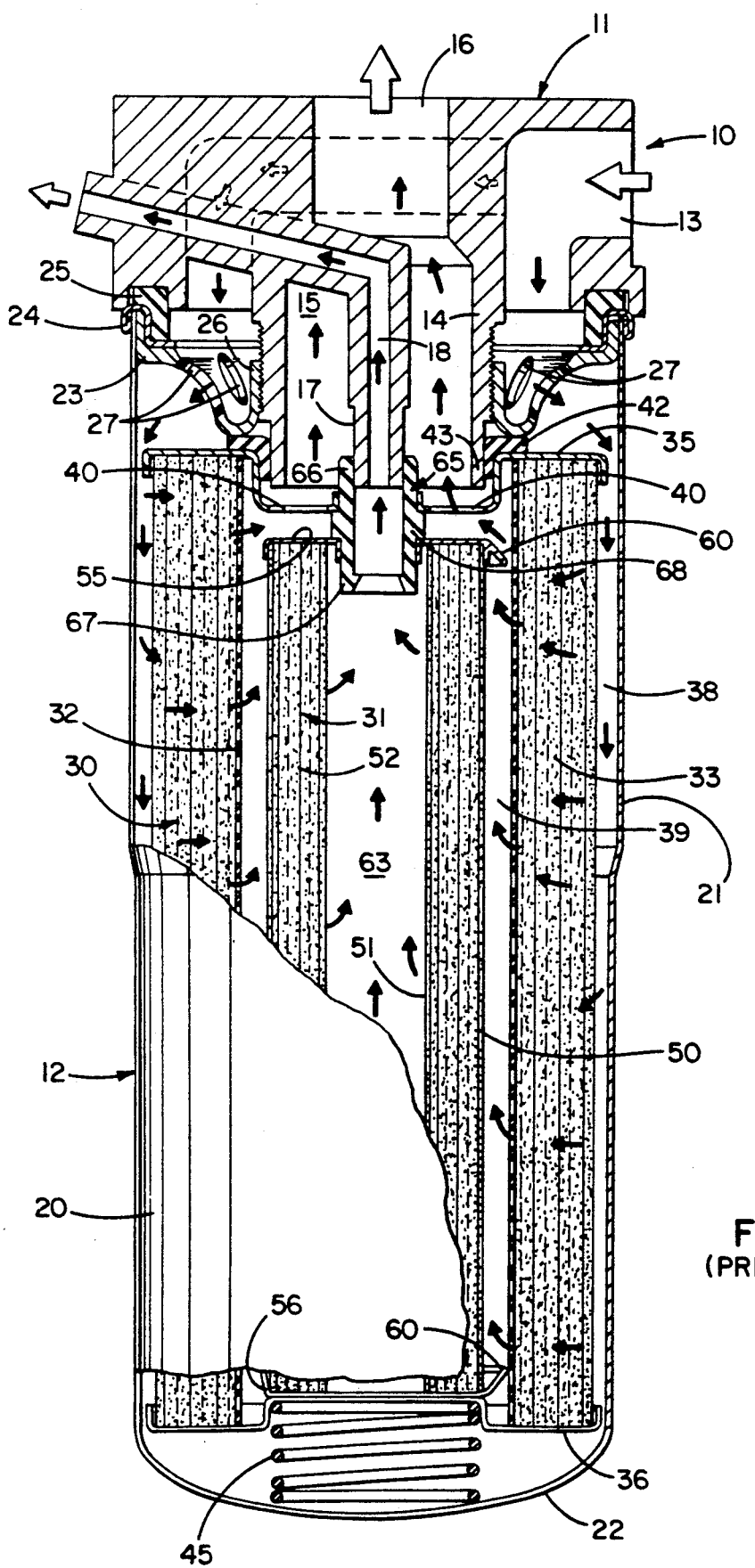
FIG. 1 is a cross-sectional view taken axially through a typical prior art filter assembly in which lubricating oil flows both through a main lubricating circuit and through an internal bypass circuit.

To best explain the present invention, reference is first made to FIG. 1 which shows a prior art filter assembly 10 adapted for use with an engine having two separate internal lubricating oil flow circuits. By way of example, oil from the crankcase may be filtered and then a substantial percentage of such oil may flow through a primary circuit to the engine bearings. A substantially smaller percentage of the filtered oil may be subjected to a second stage of filtration to remove fines and then may be returned directly to the crankcase through a separate circuit which bypasses the engine bearings.

In general, the prior art filter assembly 10 comprises two primary components, namely, (A) a mounting adaptor 11 which is attached permanently to the engine and (B) a spin-on, throwaway cartridge 12 which is adapted to be secured releasably to the adaptor. The adaptor includes an inlet 13 for receiving contaminated oil from the crankcase and for introducing such oil into the cartridge. Formed integrally with and depending from the adaptor is an externally threaded neck 14 which is tubular and which defines an outlet 15 that communicates with an outlet port 16 for discharging oil to the primary circuit for the bearings of the engine. Coaxial with and located within the neck 14 is a conduit or stem 17 which defines an outlet 18 for the oil of the bypass circuit.

The cartridge 12 includes a deep canister 20 made of sheet metal and having a cylindrical side wall 21 and a domed end wall 22 integral with one end of the side wall. The opposite end of the canister is open when the canister is formed but is adapted to be closed by a separate end plate 23 which is held in assembled relation with the canister by means of an annular sheet metal retainer 24. A resiliently yieldable ring 25 is captivated by the retainer and seals against the adaptor 11 when the cartridge 12 is attached to the adaptor. To effect such attachment, the end plate 23 is formed with an internally threaded collar 26 which is adapted to be screwed onto the neck 14.

Several angularly spaced inlet openings 27 are formed through the end plate 23. The inlet openings communicate with the inlet 13 of the adaptor 11 and deliver contaminated oil into the canister 20.

In the prior art filter cartridge 12, two filter elements 30 and 31 are located in coaxial relation within the canister 20. The filter element 30 serves to clean the oil flowing through the main lubricating circuit to the engine bearings while the filter element 31 effects more complete filtration of the oil flowing directly to the crankcase by way of the bypass circuit.

More specifically, the filter element 30 constitutes the outermost element and is of tubular construction. The filter element 30 consists of an inner perforated core 32 which supports a suitable and relative coarse filter media 33 such as pleated paper. End caps 35 and 36 are located at the ends of the filter media and captivate the media against the core.

The outer side of the filter media 33 of the element 30 is spaced inwardly from the inner side of the canister 20 and coacts therewith to define an annular chamber 38. Oil in the chamber flows radially through the media 33 and is cleaned thereby before flowing through the core 32 and into a chamber 39 defined by the interior of the tubular filter element 30. A substantial volume of the filtered oil is discharged from the chamber 39 by way of angularly spaced outlet openings 40 formed in the end cap 35. Such oil flows through the outlet 15 of the adaptor 11 to the outlet port 16 and then through the main lubricating circuit to the engine bearings.

A resiliently yieldable sealing ring 42 prevents dirty oil at the inlet openings 27 from flowing directly into the chamber 39 and forces such oil to flow through the filter media 33 to reach the chamber 39. The ring 42 includes a radially extending portion which is sandwiched between the end plate 24 and the end cap 35 and further includes an axially extending portion which is adapted to contract around an extension 43 of the threaded neck 14. A coil spring 45 is located in the canister 20 between the closed end 22 thereof and the end cap 36 of the filter element 30 and urges the end cap 35 against the sealing ring 42 so as to compress the latter between the end cap 35 and the end plate 23.

The filter element 31 of the prior art cartridge 12 is located in the chamber 39 and is coaxial with the filter element 30. The filter element 31 includes an outer wrapper 50, a perforated inner core 51 and a relatively fine pleated paper filter media 52 located between the wrapper and the core. These components are sandwiched between a pair of end caps 55 and 56 which captivate the filter media 52 against the core 51. The end cap 56 engages the inner side of the end cap 36 while the end cap 55 is spaced axially from the end cap 35.

The outer diameter of the inner filter element 31 is considerably less than the inner diameter of the outer filter element 30 and thus the presence of the filter element 31 causes the chamber 39 to be of annular configuration. Angularly spaced and radially outwardly projecting tabs 60 are formed on the end caps 55 and 56 and lightly engage the core 32 of the outer filter element 30 to help keep the inner filter element 31 in centered relation with respect to the outer filter element.

In the prior art cartridge 12, some of the filtered oil in the chamber 39 flows radially through the filter media 52 of the inner filter element 31 and flows to a chamber 63 defined by the interior of the inner filter element. A tubular fitting 65 communicates with the chamber 63 and directs such oil to the adaptor 11 while keeping the oil separated from the oil flowing through the outlet openings 40 from the chamber 39. The fitting is made of soft, flexible and rubber-like material and is formed with end portions 66 and 67 which are sealably telescoped into openings formed in the end caps 35 and 55, respectively. An enlarged collar 68 is formed around the fitting between the end portions and is sandwiched between the end caps 35 and 55 in order to establish a fixed axial spacing between the filter elements 30 and 31. When the cartridge 12 is attached to the adaptor 11, the tubular end portion 66 telescopes over and seals against the stem 17 so as to establish communication between the interior chamber 63 of the filter element 31 and the outlet 18 of the adaptor.

With the prior art filter cartridge 12, dirty oil from the inlet 13 flows through the inlet openings 27 in the end plate 23 and into the canister 20. The end plate 23, the end cap 35, the sealing ring 42 and the extension 43 coact to prevent the dirty oil from flowing directly to the interior chamber 39 of the filter element 30 and force the oil to flow to the outer chamber 38 for subsequent radial flow through the filter media 33 to the chamber 39. Most of the oil in the chamber 39 flows to the adaptor 11 via the outlet openings 40 and then flows through the neck 14 to the outlet port 16 for flow to the main lubricating circuit. Such oil is prevented by the end cap 55 and the tubular fitting 65 from flowing directly to the interior chamber 63 of the filter element 31. The remaining oil in the chamber 39 flows radially through the relatively fine filter media 52 of the filter element 31 for removal of additional contaminants. The clean oil then is discharged from the chamber 63 via the fitting 65 and flows to the bypass outlet 18 defined by the stem 17 of the adaptor 11.

If the engine is operated in an extremely dirty environment, it is sometimes necessary to use an external bypass filtering device (not shown) separate and apart from the filter cartridge 12 in order to adequately clean the oil and to eliminate the need of replacing the filter cartridge at extremely frequent intervals. If an external bypass device is used, it is necessary to close the internal bypass circuit defined in part by the outlet 18 in the conduit or stem 17 of the mounting adaptor 11. Bypass flow through both the external filtering device and the stem 17 could result in starvation of flow through the outlet port 16 to the main lubricating circuit and thus could cause damage to the engine.

The present invention contemplates the provision of a unique filter cartridge 12' (FIG. 2) which is equipped with an extremely simple and inexpensive lock-out device 75 for closing off the outlet 18' in the stem 17' and thereby disabling the internal bypass circuit when the engine is provided with a separate external bypass filter. The cartridge 12' and the lock-out device 75 are particularly characterized in that the lock-out device is rendered operable automatically as an incident to installation of the cartridge on the mounting adaptor 11' and does not require that the adaptor be modified in any fashion in order to disable the internal bypass circuit.

Figure 2:
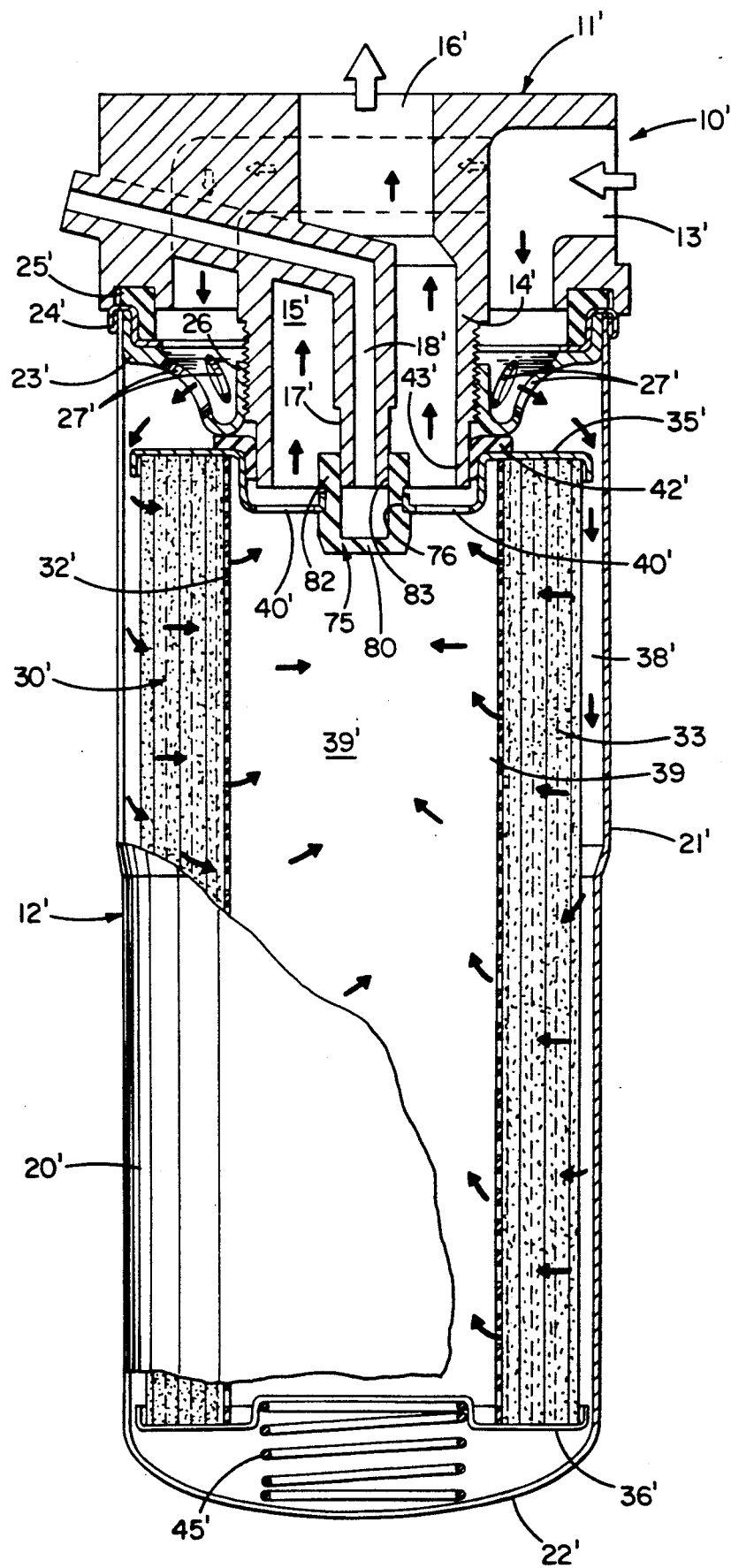
FIG. 2 is a cross-sectional view similar to FIG. 1 but shows a new and improved filter having a unique sealing plug for disabling the internal bypass circuit.

The cartridge 12' and the lock-out device 75 of the invention are shown in FIG. 2 as being attached to an adaptor 11' which is identical in every respect to the prior art adaptor 11 shown in FIG. 1. Thus, the components of the adaptor 11' of FIG. 2 have been designated with the same reference numerals as the components of the adaptor 11 of FIG. 1 but such reference numerals have been primed in FIG. 2. Also, many components of the filter cartridge 12' of the invention correspond identically to components of the prior art cartridge 12 and have been indicated by the same but primed reference numerals.

The cartridge 12' of the invention differs from the prior art cartridge 12 in one respect in that the cartridge 12' does not include an inner filter corresponding to the inner filter 31 of the cartridge 12. Accordingly, the cartridge 12' of the invention is equipped only with a single outer filter 30'. As before, dirty oil from the inlet 13' flows through the inlet openings 27' in the end plate 23' and into the canister 20'. As in the case of the cartridge 12, the end plate 23', the end cap 35', the sealing ring 42' and the extension 43' of the cartridge 12' coact to prevent the dirty oil from flowing directly to the interior chamber 39' of the filter element 30' and force the oil to flow to the outer chamber 38' for subsequent radial flow through the filter media 33' to the chamber 39'.

In carrying out the invention, the lock-out device 75 forces all of the oil in the interior chamber 39' of the filter element 30' to flow out of the outlet openings 40', forces all of such oil to flow through the neck 14' to the outlet port 16' for delivery to the main lubricating circuit, and prevents any flow of oil through the outlet 18' of the stem 17' so as to disable the internal bypass circuit. Herein, the lock-out device is a seal in the form of a generally cylindrical plug made of soft, flexible and rubber-like material and sealingly telescoped into a hole 76 formed through the end cap 35' and aligned with the stem 17'. As shown, a circumferentially extending groove is formed around the plug 75 between the ends thereof and receives a flange turned upwardly from the margin of the hole 76. The plug may be pressed into the hole and retained therein by virtue of a snap fit between the flange and the groove.

The plug 75 includes a closed lower end portion 80 located in the interior chamber 39' of the filter element 30'. By virtue of the plug 75 being sealed in the hole 76 and having the closed lower end portion 80, all oil in the chamber 39' is forced to flow out of the chamber by way of the outlet openings 40' in the end cap 35' and is prevented from flowing around or through the hole.

Further in carrying out the invention, the plug 75 includes an upper end portion 82 located above the end cap 35' and formed with a blind bore 83 which opens upwardly toward the open end of the canister 20'. When the cartridge 12' is screwed onto the adaptor 11, the blind bore 83 telescopically receives and seals against the stem 17' and thus prevents oil in the outlet 15' of the neck 14' from flowing into the outlet 18' of the stem. This disables the internal bypass circuit and forces all oil delivered to the cartridge to flow to the main lubricating circuit.

From the foregoing, it will be apparent that the present invention brings to the art a new and improved filter cartridge 12' with a unique plug 75 which closes off the stem 17' to disable the internal bypass circuit of the adaptor 11'. The plug may be made and assembled with the end cap 35' in a very economical manner, seals off the stem 17' automatically when the cartridge 12' is installed, and effects such sealing without requiring any modifications of or additions to the adaptor 11'.

We claim:

1. An oil filter cartridge comprising a canister having an open end and an opposite closed end, an end plate on the open end of said canister, inlet ports in said end plate for admitting oil into said canister, a tubular filter disposed in said canister in radially spaced relation therewith whereby oil in said canister may flow radially through said filter to the interior thereof, an end cap on one end of said filter adjacent said end plate and isolating the interior thereof from direct communication with said inlet ports, outlet ports in said end cap for permitting oil in the interior of said filter to flow out of said canister, and a seal made of resiliently yieldable material fixed to said end cap, said seal having a portion located outside of the interior of said filter and formed with a blind bore opening toward the open end of said canister.

2. An oil filter cartridge comprising a canister having an open end and an opposite closed end, an end plate on the open end of said canister, inlet ports in said end plate for admitting oil into said canister, a tubular filter disposed in said canister in radially spaced relation therewith whereby oil in said canister may flow radially through said filter to the interior thereof, an end cap on one end of said filter adjacent said end plate and isolating the interior thereof from direct communication with said inlet ports, outlet ports in said end cap for permitting oil in the interior of said filter to flow out of said canister, a hole extending through said end cap, a plug made of resiliently yieldable material fixed within and sealing said hole and having a closed end portion located within the interior of said filter to prevent oil in the interior of said filter from flowing through said end cap other than by way of said outlet openings, said plug having an opposite end portion projecting away from said end cap and away from the interior of said filter, and a blind bore formed in said opposite end portion of said plug and opening toward the open end of said canister.

3. An oil filter assembly comprising an adaptor and further comprising a spin-on cartridge attached releasably to said adaptor, said adaptor having an externally threaded neck defining a first outlet and having a conduit disposed within and coaxial with said neck and defining a second outlet, said adaptor also having an inlet for introducing oil to said cartridge, said cartridge comprising a canister having an open end and an opposite closed end, an end plate on the open end of said canister and having an internally threaded opening receiving said neck and detachably securing said canister to said adaptor, inlet openings in said end plate for admitting oil from said inlet into said canister, a tubular filter disposed in said canister in radially spaced relation therewith, an end cap on said filter adjacent said end plate and preventing oil from said inlet openings from flowing directly into the interior of said filter whereby such oil is forced to flow through said filter to the interior thereof, outlet openings in said end cap and communicating with said first outlet in said neck to permit oil in the interior of said filter to flow to said first outlet, means sandwiched between said end plate and said end cap and encircling said neck to seal said first outlet and said outlet openings from said inlet openings, a seal made of resiliently yieldable material fixed to said end cap, said seal having means located outside of the interior of said filter and engaged with said conduit to close off said conduit and prevent any oil from flowing into said conduit.

4. An oil filter assembly comprising an adaptor and further comprising a spin-on cartridge attached releasably to said adaptor, said adaptor having an externally threaded neck defining a first outlet and having a conduit disposed within and coaxial with said neck and defining a second outlet, said adaptor also having an inlet for introducing oil to said cartridge, said cartridge comprising a canister having an open end and an opposite closed end, an end plate on the open end of said canister and having an internally threaded opening receiving said neck and detachably securing said canister to said adaptor, inlet openings in said end plate for admitting oil from said inlet into said canister, a tubular filter disposed in said canister in radially spaced relation therewith, an end cap on said filter adjacent said end plate and preventing oil from said inlet opening from flowing directly into the interior of said filter whereby such oil is forced to flow through said filter to the interior thereof, outlet openings in said end cap and communicating with said first outlet in said neck to permit oil in the interior of said filter to flow to said first outlet, means sandwiched between said end plate and said end cap and encircling said neck to seal said first outlet and said outlet openings from said inlet openings, a hole extending through said end cap and aligned with said conduit, a plug fixed within and sealing said hole and having a closed end portion located within the interior of said filter to prevent oil in the interior of said filter from flowing through said end cap other than by way of said outlet openings, and a blind bore in said plug and telescopically receiving said conduit to prevent oil flowing out of said outlet openings from flowing into said conduit and to force such oil to flow to said first outlet, the closed end portion of said plug preventing oil in the interior of said filter from flowing into said bore and said conduit.

* * * * *